(12) United States Patent
Kamada

(10) Patent No.: US 8,774,720 B2
(45) Date of Patent: *Jul. 8, 2014

(54) DATA CONTROL APPARATUS, DATA CONTROL METHOD, AND STORAGE MEDIUM

(71) Applicant: Canon Kabushiki Kaisha, Tokyo (JP)

(72) Inventor: Yousuke Kamada, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,991

(22) Filed: Dec. 18, 2012

(65) Prior Publication Data

US 2013/0109318 A1    May 2, 2013

Related U.S. Application Data

(63) Continuation of application No. 12/491,392, filed on Jun. 25, 2009, now Pat. No. 8,406,688.

(30) Foreign Application Priority Data

Jun. 25, 2008    (JP) .................................. 2008-166201

(51) Int. Cl.
*H04B 7/00* (2006.01)
*H04W 24/00* (2009.01)
*G06F 15/16* (2006.01)
*G06F 17/30* (2006.01)

(52) U.S. Cl.
USPC ...... 455/41.2; 455/66.1; 455/456.1; 707/899; 709/200

(58) Field of Classification Search
CPC ...... H04B 7/26; H04B 7/005; H04B 7/18519; H04W 48/04; H04W 92/18; H04L 67/18

USPC ................ 455/456.1, 456.3, 41.1, 41.2, 41.3, 455/66.1, 556.1; 707/899; 709/200

See application file for complete search history.

(56) References Cited

U.S. PATENT DOCUMENTS

| 6,842,606 B1 | 1/2005 | Takemura |
| 6,882,854 B2 | 4/2005 | Kobayashi |
| 7,809,379 B2 | 10/2010 | Kim |
| 7,912,487 B2 | 3/2011 | Tajima et al. |
| 8,406,688 B2 * | 3/2013 | Kamada ...................... 455/41.2 |
| 2001/0049268 A1 | 12/2001 | Kobayashi |
| 2004/0192383 A1 | 9/2004 | Zacks et al. |

(Continued)

FOREIGN PATENT DOCUMENTS

| JP | 2001-345817 A | 12/2001 |
| JP | 2009-206851 A | 9/2009 |

OTHER PUBLICATIONS

JP Office Action issued Mar. 21, 2012 for JP2008-166201.

*Primary Examiner* — Andrew Wendell
(74) *Attorney, Agent, or Firm* — Rossi, Kimms & McDowell, LLP

(57) ABSTRACT

A data control apparatus that enables data communication among devices with simple operations. A first communication unit communicates with a first device placed on a predetermined surface of the data control apparatus. A second communication unit communicates with a second device. A detection unit detects a position of the first device placed on the predetermined surface of the data control apparatus. A communication control unit controls communication between the first device and the second device according to the position of the first device detected by the detection unit.

18 Claims, 13 Drawing Sheets

(56) References Cited

U.S. PATENT DOCUMENTS

| | | |
|---|---|---|
| 2004/0203786 A1 | 10/2004 | Ishiguro et al. |
| 2007/0087760 A1 | 4/2007 | Ogino et al. |
| 2008/0026772 A1 | 1/2008 | Chang et al. |
| 2008/0214233 A1 | 9/2008 | Wilson et al. |
| 2009/0176451 A1 | 7/2009 | Yang et al. |
| 2010/0234044 A1 | 9/2010 | Lohbihler |

* cited by examiner

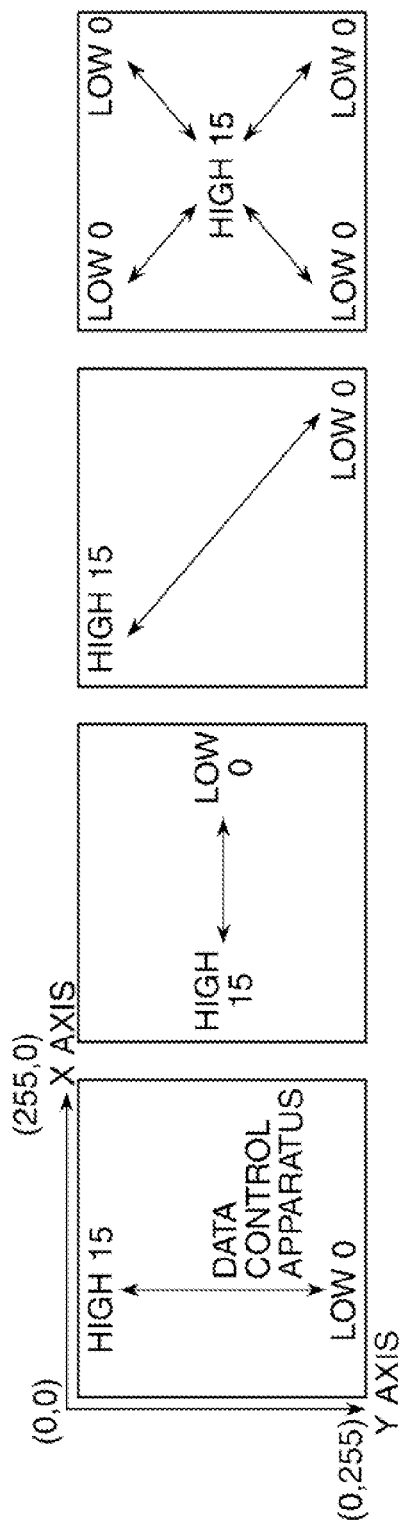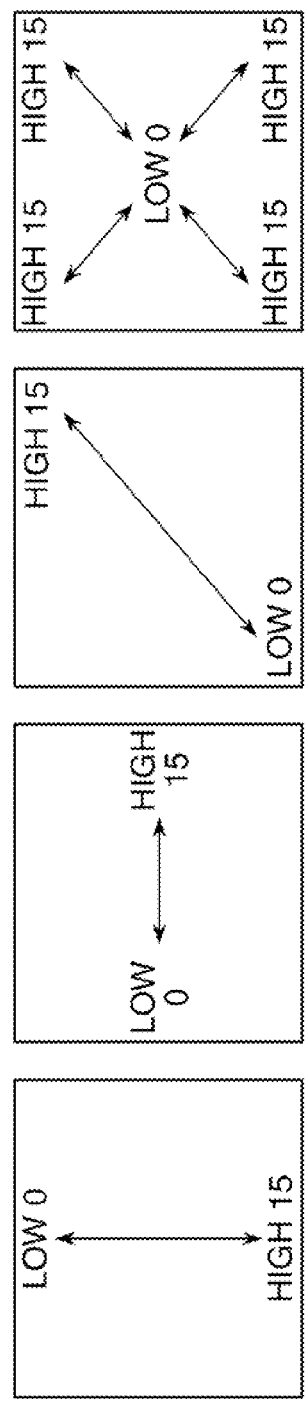

FIG. 6

| CONTROL INFORMATION VALUES | DETAILED OPERATION | OPERATION MODE |
|---|---|---|
| FIRST WIRELESS DEVICE > SECOND WIRELESS DEVICE | FIRST WIRELESS DEVICE SENDS TO SECOND WIRELESS DEVICE | FIRST WIRELESS DEVICE (SEND) : SECOND WIRELESS DEVICE (RECEIVE) |
| FIRST WIRELESS DEVICE = SECOND WIRELESS DEVICE | FIRST WIRELESS DEVICE AND SECOND WIRELESS DEVICE SEND TO AND RECEIVE FROM EACH OTHER | FIRST WIRELESS DEVICE (SEND AND RECEIVE) : SECOND WIRELESS DEVICE (SEND AND RECEIVE) |
| FIRST WIRELESS DEVICE < SECOND WIRELESS DEVICE | FIRST WIRELESS DEVICE RECEIVES FROM SECOND WIRELESS DEVICE | FIRST WIRELESS DEVICE (RECEIVE) : SECOND WIRELESS DEVICE (SEND) |

601

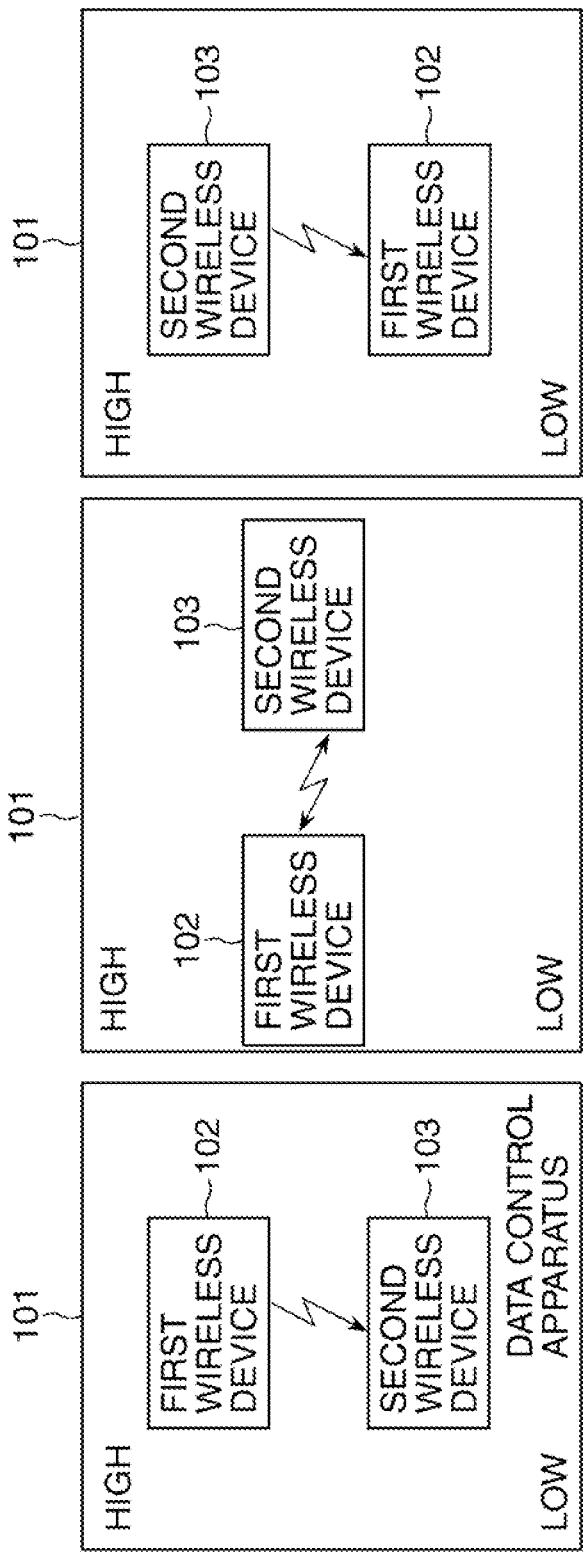

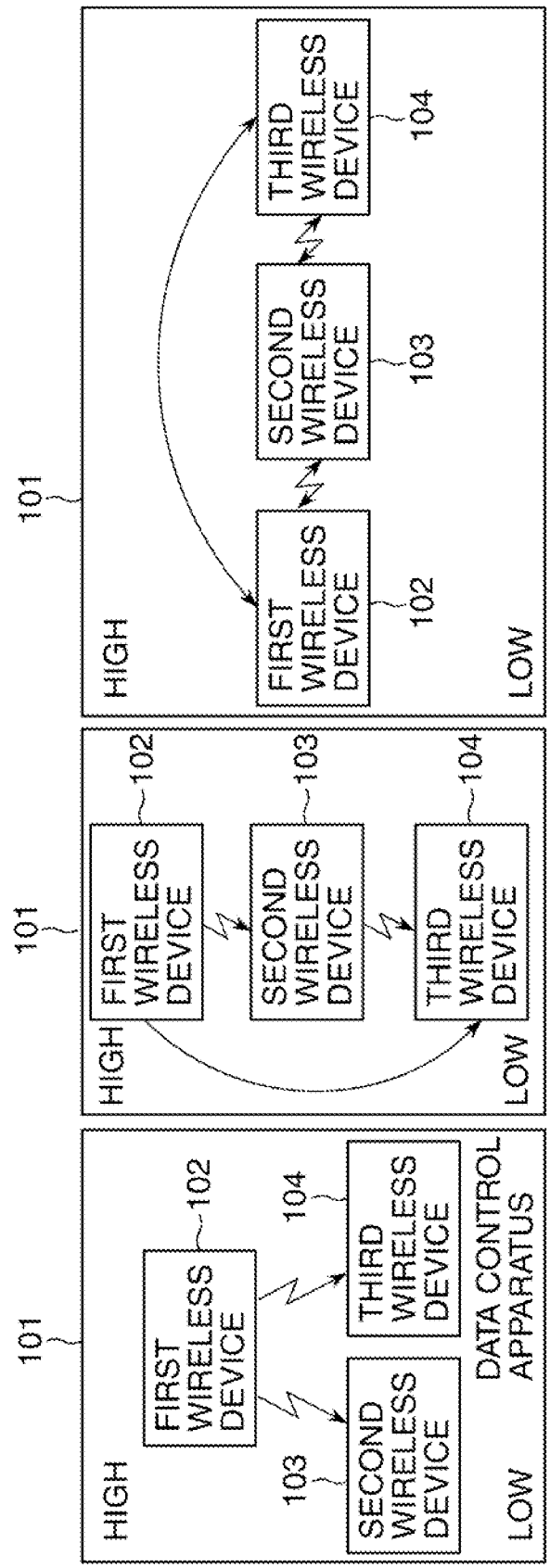

FIG. 9

DATA MANAGEMENT FORMAT 701

| IDENTIFIER | POSITION INFORMATION | CONTROL INFORMATION | OPERATION MODE | STATUS | OTHERS |
|---|---|---|---|---|---|

| ITEM | VALUES |
|---|---|
| IDENTIFIER | MAC ADDRESS, etc. |
| POSITION INFORMATION | X(0~255) Y(0~255) |
| CONTROL INFORMATION | (0 (LOW) to 15 (HIGH)) |
| OPERATION MODE | SEND (0)  RECEIVE (1)  SEND AND RECEIVE (2) |
| STATUS INFORMATION | TRANSFER SETTING COMPLETED (0), RECEPTION SETTING COMPLETED (1), TRANSMISSION SETTING COMPLETED (2), SENDING (3), RECEIVING (4), TRANSMISSION COMPLETED (5), RECEPTION COMPLETED (6), STANDBY (7) |

COMMUNICATION FORMAT 801

| IDENTIFIER | COMMAND | STATUS | OTHERS |
|---|---|---|---|

| ITEM | VALUES |
|---|---|
| IDENTIFIER | MAC ADDRESS, etc. |
| COMMAND | TRANSFER SETTING (0), RECEPTION SETTING (1), TRANSMISSION SETTING (2), START COMMUNICATION (3), STOP COMMUNICATION (4), TERMINATE COMMUNICATION (5), RESUME COMMUNICATION (6) |
| STATUS INFORMATION | TRANSFER SETTING COMPLETED (0), RECEPTION SETTING COMPLETED (1), TRANSMISSION SETTING COMPLETED (2), SENDING (3), RECEIVING (4), TRANSMISSION COMPLETED (5), RECEPTION COMPLETED (6), STANDBY (7) |

802

DATA CONTROL APPARATUS, DATA CONTROL METHOD, AND STORAGE MEDIUM

BACKGROUND OF THE INVENTION

1. Field of the Invention

The present invention relates to a data control apparatus and a data control method for controlling data communication among a plurality of devices, and a computer-readable storage medium having stored thereon a program for causing a computer to implement the method.

2. Description of the Related Art

Conventionally, data exchange of moving images, still images, and the like between devices having a storage medium has been performed via a wired connection or a portable storage medium. However, the progress in wireless communication techniques in recent years has enabled communication between devices separate from each other by providing the devices with a wireless communication interface.

Thus, devices with a wireless communication interface can easily perform data exchange of multimedia data such as moving images, still images, text information and the like with each other without a wired connection or a portable recording medium.

A data control apparatus for a plurality of wireless devices that have a communication function for performing wireless data communication is known, in which a connection between the wireless devices is established by generating an identifier of each wireless device and sending the identifier to each wireless device (see Japanese Laid-Open Patent Publication (Kokai) No. 2001-345817).

However, the above conventional data control apparatus has the following problems. For example, when data is to be transferred between devices, a user needs to make a wired connection to each device and to make settings such as a transmission mode and a reception mode for each device. Thus, a problem is that these tasks require efforts.

In addition, if the devices themselves are miniaturized, the size of an input unit such as keys and the size of a display unit for checking the setting status of the transmission mode or the reception mode are also reduced. This causes difficulty in input operations and in visual recognition of the displayed content, posing another problem.

SUMMARY OF THE INVENTION

The present invention provides a data control apparatus and a data control method that enable data communication among devices with simple operations, and a computer-readable storage medium having stored thereon a program for causing a computer to implement the method.

Accordingly, in a first aspect of the present invention, there is provided a data control apparatus comprising a first communication unit adapted to communicate with a first device placed on a predetermined surface of the data control apparatus, a second communication unit adapted to communicate with a second device, a detection unit adapted to detect a position of the first device placed on the predetermined surface of the data control apparatus, and a communication control unit adapted to control communication between the first device and the second device according to the position of the first device detected by the detection unit, wherein the first communication unit communicates with the first device by using close proximity wireless communication in which the first device is brought within a predetermined range around the first communication unit to be capable of communication, and the first device and the second device are provided to be able to communicate with each other via the data control apparatus.

According to the first aspect of the present invention, the data control apparatus includes the first communication unit communicates with the first device and the second communication unit communicates with the second device, and the position of the first device is detected to control communication between the first device and the second device according to the detected position of the first device. Thus, data communication between the devices is possible with simple operations. That is, a use can perform data transfer between the devices with simple operations.

Accordingly, in a second aspect of the present invention, there is provided a data control method using a data control apparatus comprising a first communication step of a first communication unit of the data control apparatus communicating with a first device placed on a predetermined surface of the data control apparatus, a second communication step of a second communication unit of the data control apparatus communicating with a second device, a detection step of a detection unit of the data control apparatus detecting a position of the first device placed on the predetermined surface of the data control apparatus, and a communication control step of a communication control unit of the data control apparatus controlling communication between the first device and the second device according to the position of the first device detected in the detection step, wherein in the first communication step, the first communication unit of the data control apparatus communicates with the first device by using close proximity wireless communication in which the first device is brought within a predetermined range around the first communication unit to be capable of communication, and the first device and the second device are provided to be able to communicate with each other via the data control apparatus.

Accordingly, in a third aspect of the present invention, there is provided a computer-readable storage medium having stored thereon a program for causing a computer to implement a data control method using a data control apparatus, the data control method comprising a first communication step of a first communication unit of the data control apparatus communicating with a first device placed on a predetermined surface of the data control apparatus, a second communication step of a second communication unit of the data control apparatus communicating with a second device, a detection step of a detection unit of the data control apparatus detecting a position of the first device placed on the predetermined surface of the data control apparatus, and a communication control step of a communication control unit of the data control apparatus controlling communication between the first device and the second device according to the position of the first device detected in the detection step, wherein in the first communication step, the first communication unit of the data control apparatus communicates with the first device by using close proximity wireless communication in which the first device is brought within a predetermined range around the first communication unit to be capable of communication, and the first device and the second device are provided to be able to communicate with each other via the data control apparatus.

The features and advantages of the invention will become more apparent from the following detailed description taken in conjunction with the accompanying drawings.

BRIEF DESCRIPTION OF THE DRAWINGS

FIGS. 5A, 5B, 5C, 5D, 5E, 5F, 5G, and 5H are diagrams showing control information associated with position information about a wireless device on the data control apparatus, and surfaces of the data control apparatus in contact with the wireless device.

FIG. 6 is a table showing detailed operations according to results of comparing control information values of two wireless devices (a first wireless device and a second wireless device).

FIGS. 7A, 7B, and 7C are diagrams showing data transfer utilizing the position information about the two wireless devices (the first wireless device and the second wireless device) placed on the data control apparatus and the control information associated with this position information.

FIGS. 8A, 8B, and 8C are diagrams showing data transfer utilizing the position information about three wireless devices (the first wireless device, the second wireless device, and a third wireless device) placed on the data control apparatus and the control information associated with this position information.

FIG. 9 is a diagram showing a data management format for managing a wireless device detected by the data control apparatus and a table showing the range of values assigned to each item.

FIG. 11 a diagram showing is a communication format for performing communication between the data control apparatus and a wireless device placed thereon and a table showing values assigned to each item.

DETAILED DESCRIPTION OF PREFERRED EMBODIMENTS

Embodiments of a data control apparatus, a data control method, and a storage medium of the present invention will be described with reference to the drawings. The data control apparatus in the embodiments is applied to a data transfer system for transferring data among wireless devices.

Figure 1:
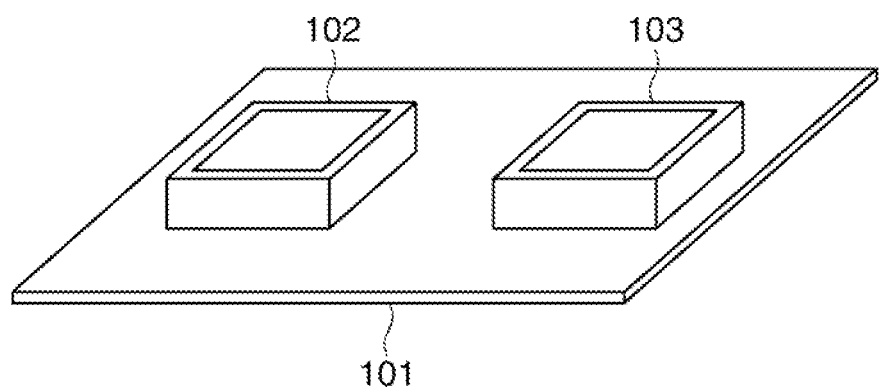
FIG. 1 is an external view showing a configuration of a data transfer system in embodiments.

FIG. 1 is an external view showing a configuration of the data transfer system in the embodiments. The data transfer system includes a first wireless device 102, a second wireless device 103, and a data control apparatus 101.

Each of the first wireless device 102 and the second wireless device 103 is an information terminal device having a communication function. Information terminal devices include various devices such as a mobile information terminal, mobile phone, digital camera, digital video camera, and mobile music player. In the embodiments, the first wireless device 102 and the second wireless device 103 will be called simply as wireless devices when discriminating between them is not particularly necessary.

The data control apparatus 101 is formed as a sheet. Provided on the surface of the data control apparatus 101 are an input unit including a capacitive touch sensor, and a display unit including a thin display panel such as of organic electroluminescence (OLED: Organic Light-Emitting Diode) or electronic paper. The structure of the data control apparatus 101 will be described later.

Figure 2:
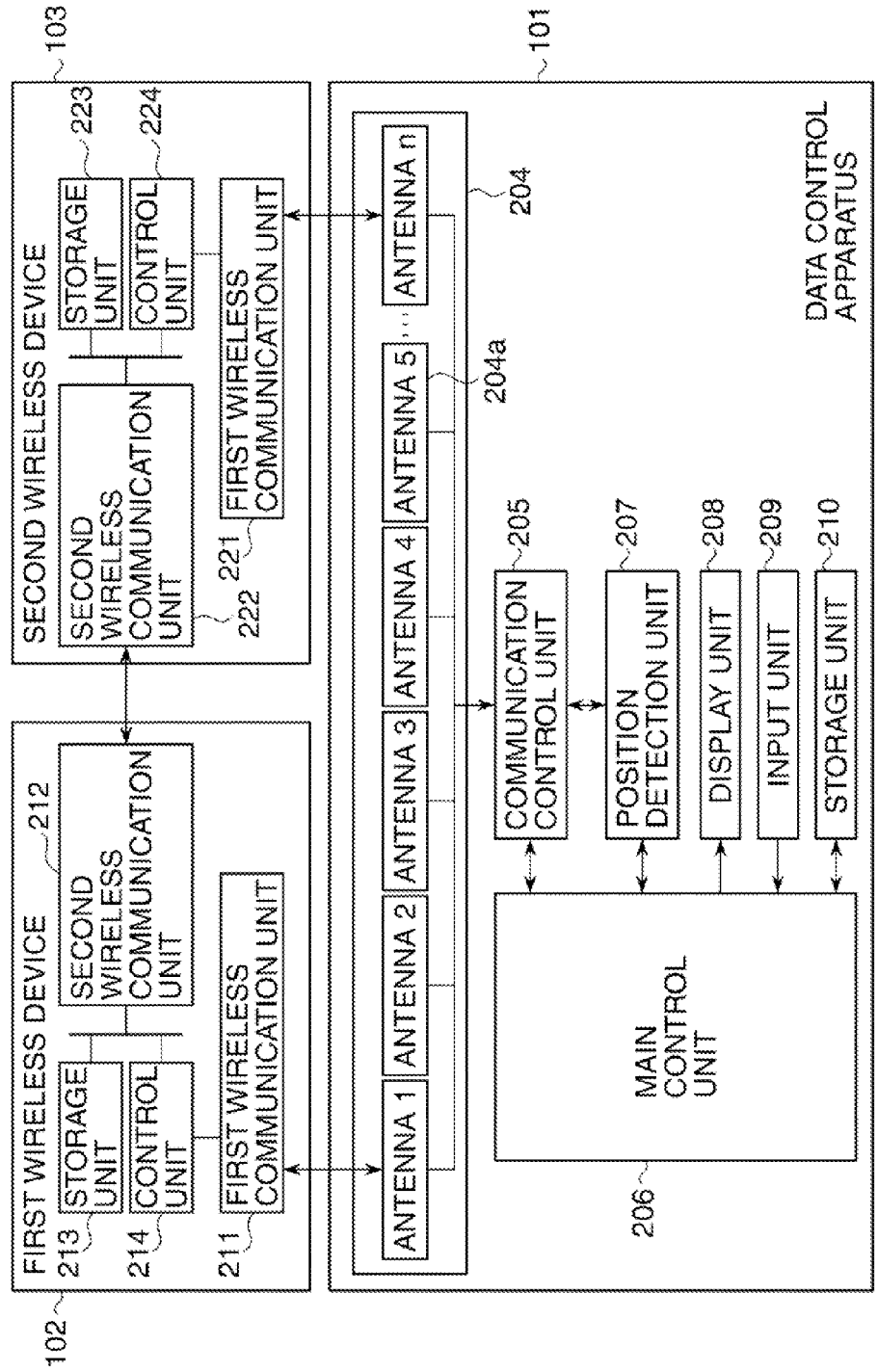
FIG. 2 is a block diagram showing a hardware configuration of the data transfer system.

FIG. 2 is a block diagram showing a hardware configuration of the data transfer system. The data control apparatus 101 has an antenna array 204, a communication control unit 205, a main control unit 206, a position detection unit 207, a display unit 208, an input unit 209, and a storage unit 210. The antenna array 204 includes a plurality of antenna modules (also simply referred to as antennas) 204a for wireless communication with wireless devices. As will be described later, the antenna modules 204a are arranged as a matrix on the surface of the data control apparatus 101 and used for detecting the positions of information device terminals placed on the data control apparatus 101. The communication control unit 205 has a communication control circuit and controls communication via the antenna array 204. The antenna array 204 can receive radio waves from nearby devices within a predetermined range, so that the data control apparatus 101 can communicate with the devices.

The main control unit 206 controls each unit in the data control apparatus 101. The position detection unit 207 detects the position of a wireless device based on information from the communication control unit 205 and obtains coordinates as position information representing this position. The display unit 208 displays information designated by the main control unit 206. The input unit 209 includes the capacitive touch sensor, as described above.

On the other hand, the first wireless device 102 has a first wireless communication unit 211, a control unit 214, a storage unit 213, and a second wireless communication unit 212. Similarly, the second wireless device 103 has a first wireless communication unit 221, a control unit 224, a storage unit 223, and a second wireless communication unit 222.

The first wireless communication units 211 and 221 are interfaces for wireless communication with the data control apparatus 101. The second wireless communication units 212 and 222 are interfaces for wireless communication with other information device terminals. Although not shown in FIG. 2, each of the first and second wireless communication units includes an antenna and a communication control circuit. The storage units 213 and 223 are storage devices for storing data. The control units 214 and 224 control the information terminal devices 102 and 103, respectively.

The main control unit 206 of the data control apparatus 101 causes the communication control unit 205 to monitor for devices capable of data communication at times of polling or interruption, and determines whether or not wireless devices are placed on the data control apparatus 101. Further, the position detection unit 207 determines the positions of the wireless devices on the data control apparatus 101 based on information from the communication control unit 205 about the radio wave intensity at the antennas.

The main control unit 206 determines the operation mode of each wireless device based on the position information about the wireless device detected by the position detection unit 207 and control information associated in advance with this position information. The main control unit 206 then transmits, to each wireless device, instructions in data transfer.

The main control unit 206 assigns an identifier to each detected wireless device and stores the identifier in the storage unit 210 along with the position information, control information, and the like. The main control unit 206 also displays icons of the detected wireless devices on the display unit 208. This display facilitates a user's recognition of the presence of the wireless devices. It is to be noted that the data control apparatus may be configured without the display unit.

The first wireless device 102 and the second wireless device 103 receive instructions in data transfer from the data control apparatus 101 via the first wireless communication units 211 and 221, respectively. For example, if the first wireless device 102 is designated as a sender and the second wireless device 103 is designated as a receiver, the control unit 214 of the first wireless device 102 uses the second wireless communication unit 212 to transfer data to the second wireless communication unit 222 of the second wireless device 103.

Figure 3:
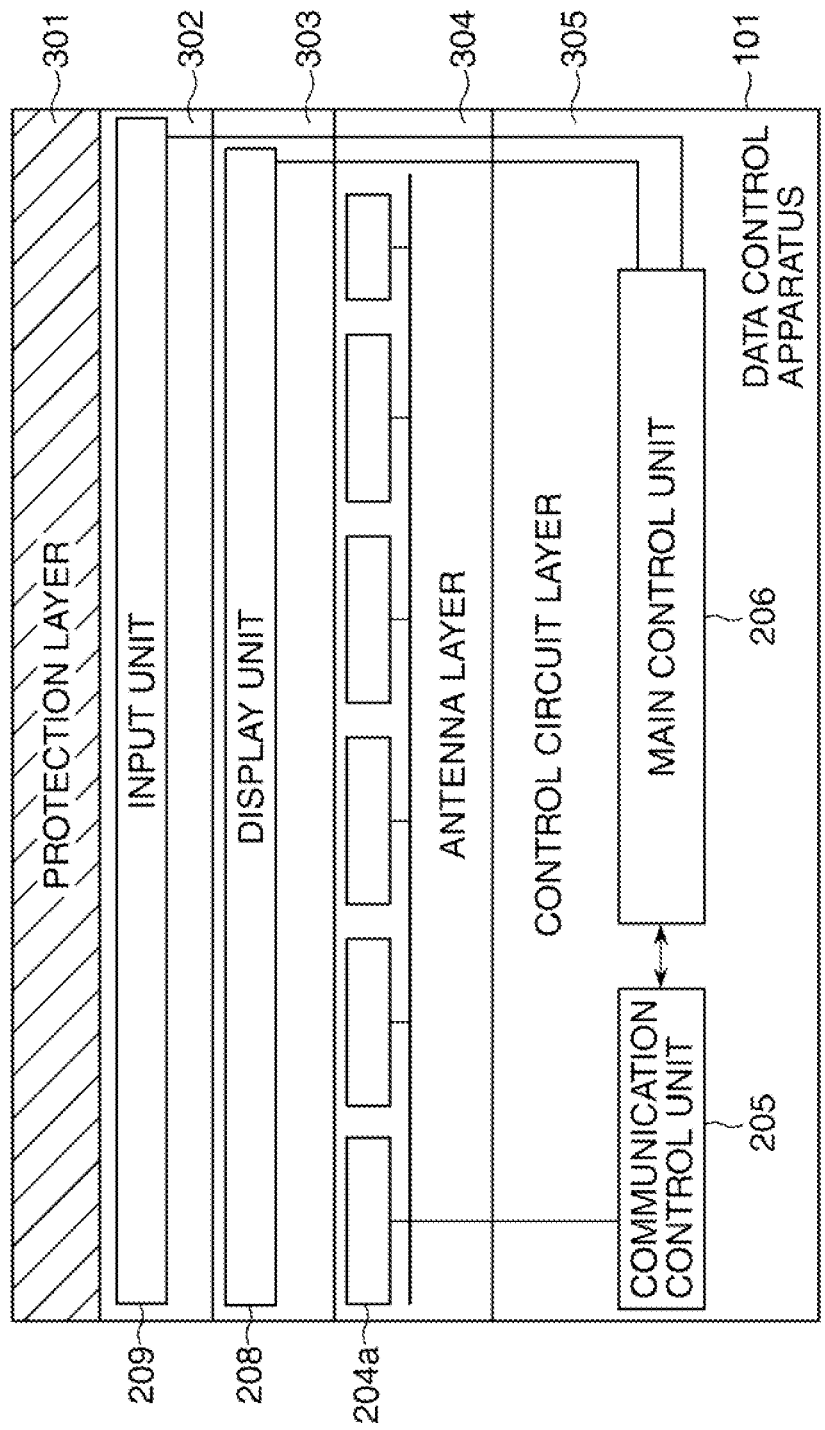
FIG. 3 is a sectional view showing a structure of a data control apparatus.

Now, the structure of the data control apparatus 101 will be described. FIG. 3 is a sectional view showing the structure of the data control apparatus 101. As described above, the data control apparatus 101 is formed as a sheet. The data control apparatus 101 includes, starting from the top, a protection layer 301 protecting the input unit, an input layer 302, a display layer 303, an antenna layer 304, and a control circuit layer 305. The input layer 302 includes the input unit 209 including the touch sensor. The display layer 303 includes the display unit 208. The antenna layer 304 includes the antenna array 204 including the antennas 204a. The control circuit layer 305 includes the main control unit 206, the communication control unit 205, and the like.

The protection layer 301 and the input layer 302 are made of light-transmissive members to allow the content displayed in the display layer 303 below to be seen from the top. The total thickness of the protection layer 301, the input layer 302, and the display layer 303 is sufficiently less than the maximum allowable communication distance in performing wireless communication between a wireless device placed on the surface of the apparatus and the antenna modules in the antenna layer 304, so as not to prevent the wireless communication.

With such a configuration adopted, the surface of the protection layer 301 shown in FIG. 3 serves as a communication plane for placing other devices thereon to start communication, that is, as a communication interface.

Figure 4:
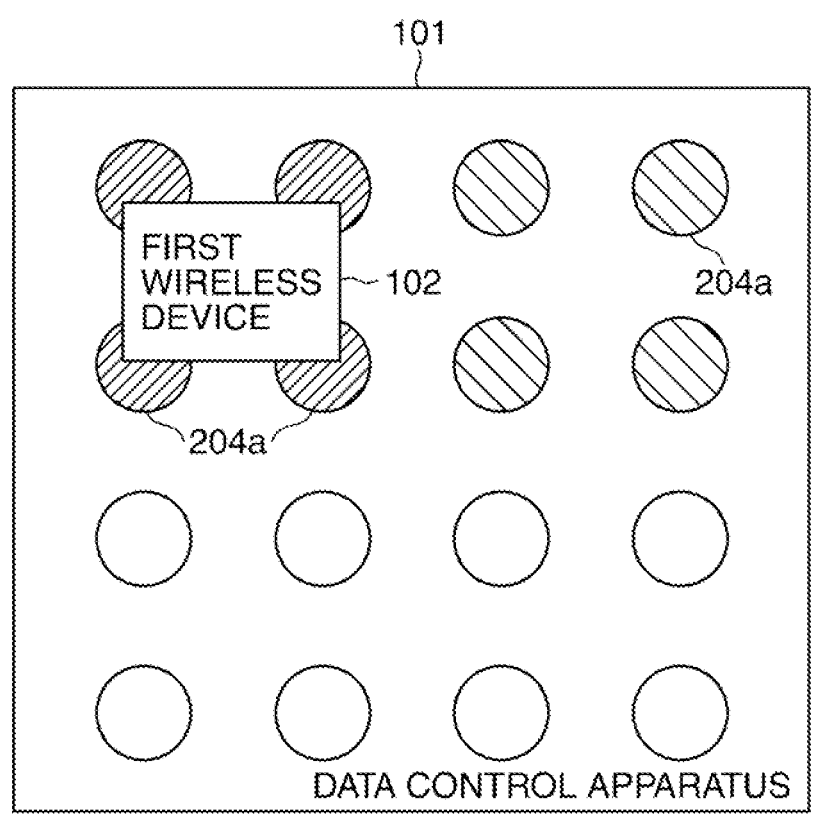
FIG. 4 is a diagram showing an arrangement of antennas of the data control apparatus.

FIG. 4 is a diagram showing an arrangement of the antennas of the data control apparatus 101. The antennas 204a are arranged as a matrix on the upper surface of the data control apparatus 101. When a wireless device is placed on the data control apparatus 101, the radio wave intensity at antennas 204a close to where the wireless device is placed increases. This allows determination of the position of the wireless device placed on the data control apparatus 101.

That is, when a wireless device is placed on the data control apparatus 101, the position detection unit 207 calculates the position information about the wireless device as two-dimensional coordinates. Here, the upper-left corner on the data control apparatus 101 shown in FIG. 4 is set as (X, Y)=(0, 0), and the lower-right corner is set as (X, Y)=(255, 255). The control information is four-bit value (0 (low) to 15 (high)) associated with this position information of the two-dimensional coordinates.

FIGS. 5A, 5B, 5C, 5D, 5E, 5F, 5G, and 5H are diagrams showing the control information associated with the position information about a wireless device on the data control apparatus 101, and upper surfaces of the data control apparatus 101 in contact with the wireless device. In the embodiments, where the X axis and the Y axis are defined as shown in FIG. 5A, it is assumed that the right side is in the direction in which the value of X increases, and the lower side is in the direction in which the value of Y increases.

In FIG. 5A, the control information value of a point on the upper side is set to be the highest, and the control information value of a point on the lower side is set to be the lowest of the upper surface of the data control apparatus 101. In FIG. 5B, the control information value of a point on the upper side is set to be the lowest, and the control information value of a point on the lower side is set to be the highest of the upper surface of the data control apparatus 101.

In FIG. 5C, the control information value of a point on the left side is set to be the highest, and the control information value of a point on the right side is set to be the lowest of the upper surface of the data control apparatus 101. In FIG. 5D, the control information value of a point on the right side is set to be the highest, and the control information value of a point on the left side is set to be the lowest of the upper surface of the data control apparatus 101.

In FIG. 5E, the control information value of a point on the upper-left corner is set to be the highest, and the control information value of a point on the lower-right corner is set to be the lowest of the upper surface of the data control apparatus 101. In FIG. 5F, the control information value of a point on the upper-right corner is set to be the highest, and the control information value of a point on the lower-left corner is set to be the lowest of the upper surface of the data control apparatus 101.

In FIG. 5G, the control information value of a point at the center is set to be the highest, and the control information values of points farther from the center are set to be lower of the upper surface of the data control apparatus 101. In FIG. 5H, the control information values of points farther from the center are set to be higher, and the control information value of a point at the center is set to be the lowest of the upper surface of the data control apparatus 101.

The user can specify any of these settings of the control information via the input unit 209. It is to be noted that the setting of the control information may be fixed beforehand.

FIG. 6 is a table showing detailed operations according to results of comparing the control information values of two wireless devices (the first wireless device 102 and the second wireless device 103). FIGS. 7A, 7B, and 7C are diagrams showing data transfer utilizing the position information about the two wireless devices (the first wireless device 102 and the second wireless device 103) placed on the data control apparatus 101 and the control information associated with this position information.

The table 601 shows the detailed operations and operation mode settings in data transfer according to the magnitude relationship resulting from comparing the control information values of the two wireless devices (the first wireless device 102 and the second wireless device 103) placed on the data control apparatus 101.

Specifically, if the control information value of the first wireless device 102 is larger than the control information value of the second wireless device 103, i.e., if the two wireless devices are in the positional relationship shown in FIG. 7A, the data control apparatus 101 operates as follows. The data control apparatus 101 sets the operation mode of the first wireless device 102 to "send", and the operation mode of the second wireless device 103 to "receive". The data control apparatus 101 further issues instructions so that the first wireless device 102 transfers data to the second wireless device 103. Therefore, data of the first wireless device 102 is transferred to the second wireless device 103.

If the control information value of the first wireless device 102 and the control information value of the second wireless device 103 are the same, i.e., if the two wireless devices are in the positional relationship shown in FIG. 7B, the data control apparatus 101 operates as follows. The data control apparatus 101 sets the operation mode of the first wireless device 102 and the second wireless device 103 to "send and receive" and issues instructions so that they transfer data to each other. Therefore, data of the first wireless device 102 is transferred to the second wireless device 103, and data of the second wireless device 103 is transferred to the first wireless device 102.

If the control information value of the first wireless device 102 is smaller than the control information value of the second wireless device 103, i.e., if the two wireless devices are in the positional relationship shown in FIG. 7C, the data control apparatus 101 operates as follows. The data control apparatus 101 sets the operation mode of the second wireless device 103 to "send", and the operation mode of the first wireless device 102 to "receive". The data control apparatus 101 further issues instructions so that the second wireless device 103 transfers data to the first wireless device 102. Therefore, data of the second wireless device 103 is transferred to the first wireless device 102.

FIGS. 8A, 8B, and 8C are diagrams showing data transfer utilizing the position information about three wireless devices (the first wireless device 102, the second wireless device 103, and a third wireless device 104) placed on the data control apparatus 101 and the control information associated with this position information.

FIG. 8A shows data transfer in the case where, among the three wireless devices, the first wireless device 102 is placed at a position with a larger control information value, and the second wireless device 103 and the third wireless device 104 are placed at positions with a smaller control information value.

In this case, the first wireless device 102 is placed at the position with the control information value larger than that of the second wireless device 103 and the third wireless device 104. The second wireless device 103 and the third wireless device 104 are placed at the positions with the same control information value. Therefore, the data control apparatus 101 sets the operation mode of the first wireless device 102 to "send" and sets the operation mode of the second wireless device 103 and the third wireless device 104 to "receive". The data control apparatus 101 further issues instructions so that the first wireless device 102 transfers data to the second wireless device 103 and the third wireless device 104. Therefore, data of the first wireless device 102 is transferred to the second wireless device 103 and the third wireless device 104.

FIG. 8B shows data transfer in the case where, among the three wireless devices, the first wireless device 102 is placed at a position with a larger control information value, and the third wireless device 104 is placed at a position with a smaller control information value. The second wireless device 103 is placed at a position with a control information value between those of the first wireless device 102 and the third wireless device 104.

In this case, the first wireless device 102 is placed at the position with the control information value larger than those of the second wireless device 103 and the third wireless device 104. The second wireless device 103 is placed at the position with the control information value larger than that of the third wireless device 104. Therefore, the data control apparatus 101 sets the operation mode of the first wireless device 102 to "send", sets the operation mode of the second wireless device 103 to "send and receive", and sets the operation mode of the third wireless device 104 to "receive". The data control apparatus 101 further issues instructions so that the first wireless device 102 transfers data to the second wireless device 103 and the third wireless device 104, and so that the second wireless device 103 transfers data to the third wireless device 104. Therefore, data of the first wireless device 102 is transferred to the second wireless device 103, and data of the first wireless device 102 and the second wireless device 103 is transferred to the third wireless device 104.

FIG. 8C shows data transfer in the case where, among the three wireless devices, the first wireless device 102, the second wireless device 103, and the third wireless device 104 are placed at positions at the same height.

In this case, the first wireless device 102, the second wireless device 103, and the third wireless device 104 are placed at the positions with the same control information value. Therefore, the data control apparatus 101 sets the operation mode of the first wireless device 102, the second wireless device 103, and the third wireless device 104 to "send and receive". The data control apparatus 101 further issues instructions so that each wireless device transfers data to each other. Therefore, data of the second wireless device 103 and the third wireless device 104 is transferred to the first wireless device 102. Data of the first wireless device 102 and the third wireless device 104 is transferred to the second wireless device 103. Data of the first wireless device 102 and the second wireless device 103 is transferred to the third wireless device 104.

Data transfer is performed in a similar manner even among four or more wireless devices. That is, if all the four wireless devices have the same control information value, the data control apparatus issues instructions so that all the wireless devices exchange data to each other. If the wireless devices have different control information values, the data control apparatus issues instructions so that wireless devices placed at positions with larger control information values transfer data only to wireless devices placed at positions with smaller control information values.

FIG. 9 is a diagram showing a data management format for managing a wireless device detected by the data control apparatus 101 and a table showing the range of values assigned to each item. The data management format 701 is a format for storing an identifier assigned to the wireless device identified by the data control apparatus 101, and information about the wireless device such as the position information, the control information, the operation mode, and the status information. The management information represented in this data management format 701 is stored in the storage unit 210. It is to be noted that the control information is used for determining the operation mode and may not be included in the data management format.

The table 702 relates to the content of the position information, the control information, the operation mode, and the status information about the wireless device placed on the data control apparatus 101. The position information about the wireless device is represented in the range of values 0 to 255 as the two-dimensional coordinates on the X axis and the Y axis. The control information is set as a value from 0 (low) to 15 (high). The operation mode is set as 0 (send), 1 (receive), or 2 (send and receive). As the status information, eight patterns including "sending" and "receiving" are available.

Figure 10A:
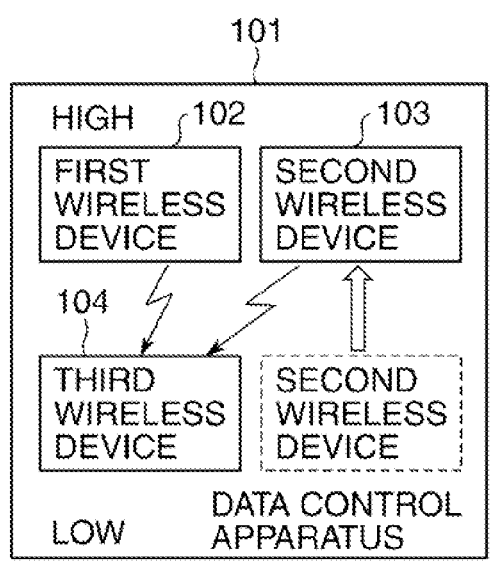
FIGS. 10A and 10B are diagrams showing a position change and the priority in data transfer among a plurality of wireless devices placed on the data control apparatus.
Figure 10B:
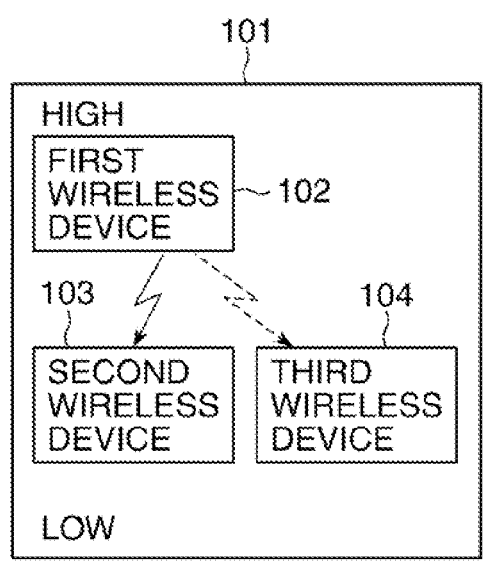

FIGS. 10A and 10B are diagrams showing a position change and the priority in data transfer among a plurality of wireless devices placed on the data control apparatus 101. FIG. 10A shows the case where the second wireless device 103 is moved to a position at the same height as the first wireless device 102 while the first wireless device 102 is performing data transfer to the second wireless device 103 and the third wireless device 104.

At this point, if any file is being transferred between the first wireless device 102 and the second wireless device 103, the data control apparatus 101 operates as follows. Even though the position of the second wireless device 103 has changed, the data control apparatus 101 allows the first wireless device 102 to continue the data transfer to the second wireless device 103 until the transfer of the file is completed normally. That is, the data transfer is continued based on the positional relationship among the wireless devices before the change. Once the file has been transferred, the data control apparatus 101 automatically issues instructions to transition to data transfer processing between the second wireless device 103 and the third wireless device 104 without user operations. In this manner, the data in the process of transfer can be reliably transferred to the end, and the next data transfer can be immediately performed.

FIG. 10B shows the priority in the case where the first wireless device 102 transfers data to the second wireless device 103 and the third wireless device 104. If the first wireless device 102 can connect with only one wireless device by wireless communication, it is necessary to determine which of the second wireless device 103 and the third wireless device 104 having the same control information value should be the first destination. Here, the data control apparatus 101 determines the physical distance based on the position information about the first wireless device 102 and the position information about the second wireless device 103 or the third wireless device 104. The data control apparatus 101 then instructs the first wireless device 102 to transfer data preferentially to a closer wireless device. In the case of FIG. 10B, data is transferred preferentially to the second wireless device 103. In this manner, in performing data communication among wireless devices, data can be transferred in predetermined order even when connection is allowed with only one wireless device.

FIG. 11 is a diagram showing a communication format for performing communication between the data control apparatus 101 and a wireless device placed thereon and a table showing values assigned to each item. The communication format 801 includes an identifier assigned by the data control apparatus 101, commands for the data control apparatus 101 to notify the wireless device of the start of a communication and the like, and the status information for the wireless device to notify the data control apparatus 101 of the completion of transmission and the like.

The table 802 shows values of each item in the communication format. Defined as the commands to be issued by the data control apparatus 101 to wireless devices are twelve types of commands (seven types of commands are shown in FIG. 11) necessary for data transfer among wireless devices. The identifier and the statuses are the same as in the data management format in FIG. 9.

Figure 12:
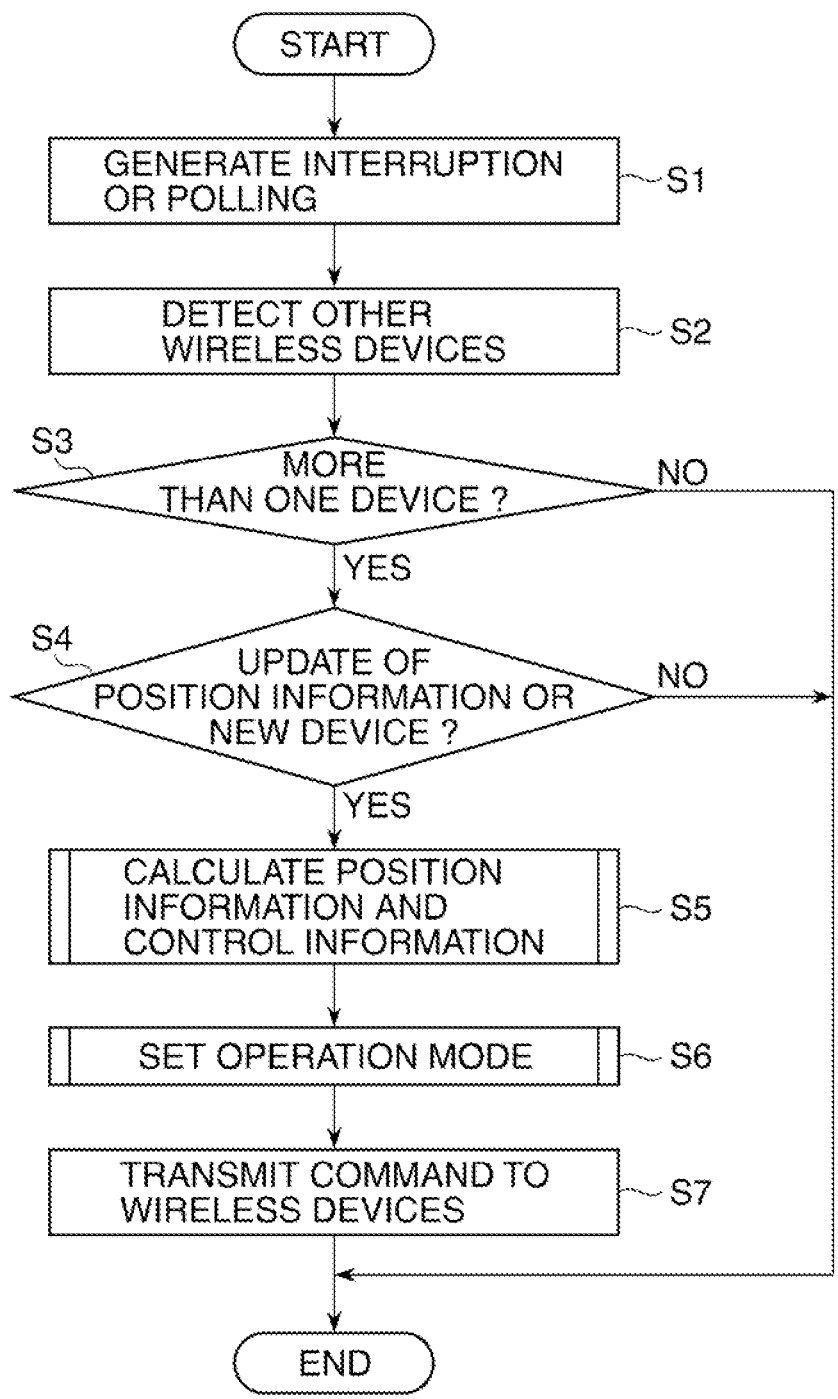
FIG. 12 is a flowchart showing a communication procedure performed by the data control apparatus for data transfer between the first wireless device and the second wireless device placed on the data control apparatus.

FIG. 12 is a flowchart showing a communication procedure performed by the data control apparatus 101 for data transfer between the first wireless device 102 and the second wireless device 103 placed on the data control apparatus 101. These operations of the data control apparatus 101 are implemented by a CPU in the main control unit 206 periodically executing a control program stored in memory in the main control unit 206.

First, the main control unit 206 generates interruption or polling (step S1) to cause the communication control unit 205 to start detection of other wireless devices (step S2). If a wireless device is detected in this detection operation, the main control unit 206 assigns an identifier to the detected wireless device.

The main control unit 206 determines whether or not a plurality of wireless devices have been detected (step S3). If a plurality of wireless devices have been detected, the main control unit 206 proceeds to step S4 to continue the process. On the other hand, if only one wireless device has been detected, or if no wireless devices have been detected, the main control unit 206 performs no processing and terminates this process.

If a plurality of wireless devices have been detected, the main control unit 206 determines whether or not there is a wireless device that is newly registered, or a wireless device that is already registered and has its position information changed (step S4). If there is a wireless device that is newly registered or a wireless device that is already registered and has its position information changed, the main control unit 206 proceeds to step S5 to continue the process. On the other hand, if there is neither a wireless device that is newly registered nor a wireless device that is already registered and has its position information changed, the main control unit 206 performs no processing and terminates this process.

The main control unit 206 recalculates the position information about all wireless devices relevant to the wireless device with its position information changed or the newly registered wireless device (step S5).

The main control unit 206 determines the operation mode (send, receive, or send and receive) from the position information obtained by the recalculation and the control information associated with this position information (step S6). At this point, the main control unit 206 stores respective data in the storage unit 210 in the form of the data management format in FIG. 9.

The main control unit 206 then updates the content of the communication format for all the wireless devices (here, the first wireless device 102 and the second wireless device 103) and transmits it to each wireless device (step S7). Thereafter, the main control unit 206 terminates the process. It is to be noted that the processing in steps S6 and S7 are an exemplary operation unit.

Figure 13:
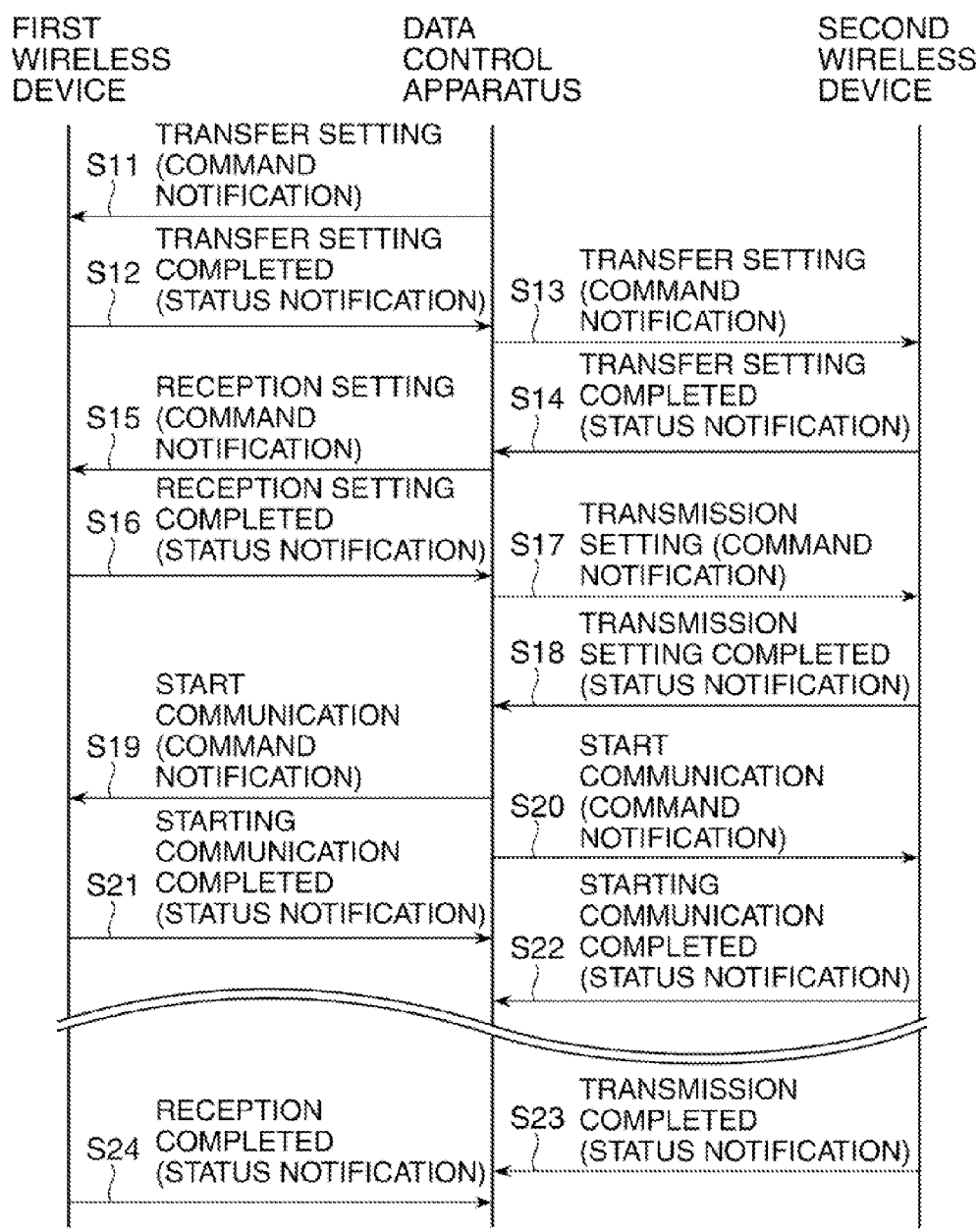
FIG. 13 is a diagram showing a process flow in which the first wireless device and the second wireless device perform and complete data transfer while the data control apparatus communicates with the first wireless device and the second wireless device.

FIG. 13 is a diagram showing a process flow in which the first wireless device 102 and the second wireless device 103 perform and complete data transfer while the data control apparatus 101 communicates with the first wireless device 102 and the second wireless device 103. It is assumed here that the first wireless device 102 is set as a receiver and the second wireless device 103 is set as a sender.

The operations of the data control apparatus 101 are implemented by the CPU in the main control unit 206 executing a control program stored in the memory in the main control unit 206. The operations of the first wireless device 102 and the second wireless device 103 are implemented by a CPU in the control units 214 and 224 executing a control program stored in memory in the control units 214 and 224, respectively.

The data control apparatus 101 notifies the first wireless device 102 and the second wireless device 103 of "transfer setting" for setting the wireless devices to a state capable of transfer (steps S11 and S13). Here, a command in the communication format in FIG. 11 is used to make the notifications.

When the processing of switching each wireless device to the transfer mode is finished, the first wireless device 102 and the second wireless device 103 notify the data control apparatus 101 of "transfer setting completed" (step S12 and S14). Here, the status information in the communication format in FIG. 11 is used to make the notifications.

Upon receiving the completion notification from each wireless device, the data control apparatus 101 notifies the first wireless device 102 of "reception setting" for making a data reception setting (step S15). The data control apparatus 101 further notifies the second wireless device 103 of "transmission setting" for making a data transmission setting (step S17). Here, commands in the communication format in FIG. 11 are used to make the notifications.

When the processing of the reception setting and the transmission setting is completed, the first wireless device 102 and the second wireless device 103 notify the data control apparatus 101 of "reception setting completed" and "transmission setting completed", respectively (steps S16 and S18). Here, the status information in the communication format in FIG. 11 is used to make the notifications.

Upon receiving the completion notification from each wireless device, the data control apparatus 101 notifies the first wireless device 102 and the second wireless device 103 of "start communication" (steps S19 and S20). Here, a command in the communication format in FIG. 11 is used to make the notifications.

When the processing of starting the communication is completed, the first wireless device 102 and the second wireless device 103 notify the data control apparatus 101 of "starting communication completed", respectively (steps S21 and S22). Here, the status information in the communication format in FIG. 11 is used to make the notifications.

Upon receiving the "starting communication completed" notification from each wireless device, the data control apparatus 101 enters a standby state.

When the transmission processing and reception processing of the respective wireless devices are finished, the first wireless device 102 and the second wireless device 103 notify the data control apparatus 101 of "reception completed" and "transmission completed", respectively (steps S24 and S23). Here, the status information in the communication format in FIG. 11 is used to make the notifications. The data transfer is thus finished.

Thus, according to the data transfer system in the embodiments, data transfer performed among a plurality of wireless devices having a wireless communication function is enabled with simple operations.

That is, when data transfer among a plurality of devices is desired, the user only needs to place the wireless devices at intended positions on the data control apparatus. Then, necessary data transfer processing such as determining the destinations, setting the communication modes, and setting the start of the communication, can be automatically performed.

Also, the user can easily perform the data exchange only with the intuitive operations of placing the wireless devices at the intended positions on the data control apparatus. As a result, the user's setting operation errors and troublesome operations can be reduced.

Therefore, data communication among the devices can be performed with simple operations even if miniaturization of the devices causes reductions in the sizes of the input unit and display unit of the devices to make operations of the devices difficult.

If the data control apparatus is provided with the display unit as in the embodiments, the transfer status can be recognized in real time. Therefore, the user can easily know the states of the devices even when data transfer is performed among information terminal devices without a display unit.

Further, assigning the identifiers facilitates identification of the devices.

The positions of the devices are detected by the sensors arranged as a matrix. Therefore, the user can start communication simply by placing the devices without the need to precisely determine where to place the devices.

Since updating the management information and switching the operation mode periodically occur, changes in the placement of the devices can be quickly addressed.

As will be described later, if the data control apparatus intermediates in data transfer among the wireless devices, protocol conversion can be performed to enable data communication among the devices that support different protocols.

Since the data control apparatus 101 is formed as a sheet, the handling of the data control apparatus is significantly facilitated.

Further, in the case where data is transferred from a sender wireless device to a plurality of receiver wireless devices, the priority in the data transmission can be set based on the distance between the sender wireless device and each receiver wireless device. This allows performing data transfer in predetermined order even if a connection can be made with only one device in the data communication among the wireless devices.

If the position information about a wireless device is changed during data transfer, the data control apparatus 101 allows the data transfer to be continued, and after the completion of the data transfer, updates the management information and switches the operation mode. Therefore, the change in the position information can be quickly addressed without interrupting the data transfer.

For a plurality of destination wireless devices, a plurality of antenna modules 204*a* can be used as communication units to simultaneously transfer data. This allows more efficient data transfer.

The present invention is not limited to the configurations in the above embodiments. Rather, any configurations are applicable as long as they can accomplish functions set forth in the claims or functions of the configurations of the embodiments.

For example, the data control apparatus 101 can also intermediate in data transfer between the first wireless device 102 and the second wireless device 103. In the case where the first wireless device 102 is set as a sender and the second wireless device 103 is set as a receiver, the first wireless device 102 uses the second wireless communication unit 212 to transmit data to the data control apparatus 101. After the data transfer is completed, the data control apparatus 101 can transfer the data to the second wireless communication unit 222 of the second wireless device 103, provided that the storage unit 210 of the data control apparatus 101 has a large capacity. Alternatively, the data control apparatus 101 can receive data from the first wireless device 102 and simultaneously transmit data to the second wireless device 103. Thus, if a wireless device set as a sender has a plurality of destinations, the data control apparatus having a plurality of communication antennas can transfer data more efficiently in the case where simultaneous data transfer is performed.

If the data control apparatus can intermediate data transfer in this manner, the following is possible. Even when the first wireless device 102 and the second wireless device 103 use different communication protocols, data transfer is possible if the data control apparatus supports both communication protocols of the first wireless device 102 and the second wireless device 103. Specifically, the data control apparatus can intermediate to perform protocol conversion in data communication of one or both of the wireless devices so that the wireless devices can communicate data with a protocol supported by both wireless devices. Thus, data transfer between the wireless devices using the different communication protocols can be realized.

In the above embodiments, short-distance radio communication is performed between the wireless devices (information terminal devices) and the data control apparatus. However, short-distance infrared communication (IrDA), or communication via inter-terminal connections may be performed. The positions of the information terminal devices placed on the data control apparatus may be detected by alternative techniques such as a pressure sensor, instead of detecting based on the radio wave intensity at the antennas. Thus, the connection between the information device terminals and the data control apparatus may be of either contact type or contactless type.

Although the data control apparatus is in sheet form in the above embodiments, it is not necessarily limited to the sheet form. For example, the data control apparatus may be in box form with a certain height.

It is to be understood that the objects of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored thereon constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-166201 filed Jun. 25, 2008, which is hereby incorporated by reference herein in its entirety.

What is claimed is:

1. A data control apparatus, comprising:
   a first communication unit adapted to communicate with a first device placed on a predetermined surface of the data control apparatus;
   a second communication unit adapted to communicate with a second device;
   a detection unit adapted to detect a position of the first device placed on the predetermined surface of the data control apparatus; and
   a communication control unit adapted to control the first communication unit and the second communication unit, based on the position of the first device detected by the detection unit, whether to cause data to be transmitted from the first device to the second device or to cause data to be transmitted from the second device to the first device.

2. The data control apparatus according to claim 1, further comprising a control information storage unit adapted to store positions on the predetermined surface of the data control apparatus and control information associated therewith, wherein
   the communication control unit control the first communication unit and the second communication unit, based on the position of the first device detected by the detection unit, whether to cause data to be transmitted from the first device to the second device or to cause data to be transmitted from the second device to the first device.

3. The data control apparatus according to claim 1, wherein
   the second communication unit communicates with the second device placed on the predetermined surface of the data control apparatus,
   the detection unit detects positions of the first device and the second device placed on the predetermined surface of the data control apparatus, and
   the communication control unit controls the communication between the first device and the second device according to the positions of the first device and the second device detected by the detection unit.

4. The data control apparatus according to claim 3, further comprising an identification unit adapted to determine whether or not each of the first device and the second device placed on the predetermined surface of the data control apparatus is capable of communication and to assign an identifier to the device determined to be capable of communication.

5. The data control apparatus according to claim 1, wherein the detection unit detects the position of the first device placed on the predetermined surface of the data control apparatus with sensors arranged as a matrix on the predetermined surface of the data control apparatus.

6. The data control apparatus according to claim 2, wherein the control information comprises values whose magnitudes can be compared.

7. The data control apparatus according to claim 1, wherein
   the detection unit redetects the position of the first device placed on the predetermined surface of the data control apparatus, and
   the communication control unit redetermines, when the detection units detects change of the position of the first device as a result of the redetection thereof, whether to control to cause data to be transmitted from the first device to the second device or to control to cause data to be transmitted from the second device to the first device.

8. The data control apparatus according to claim 7, wherein the communication control unit redetermines, when the detection unit detects change of the position of the first device as a result of the redetection by the detection unit while the data sending and receiving between the first device and the second device is performed, whether to control to cause data to be transmitted from the first device to the second device or to control to cause data to be transmitted from the second device to the first device, after the running data sending and receiving between the first device and the second device has been completed.

9. A data control method using a data control apparatus, comprising:
a first communication step of a first communication unit of the data control apparatus communicating with a first device placed on a predetermined surface of the data control apparatus;
a second communication step of a second communication unit of the data control apparatus communicating with a second device;
a detection step of a detection unit of the data control apparatus detecting a position of the first device placed on the predetermined surface of the data control apparatus; and
a communication control step of a communication control unit of the data control apparatus control the first communication unit and the second communication unit, based on the position of the first device detected by the detection unit, whether to cause data to be transmitted from the first device to the second device or to cause data to be transmitted from the second device to the first device.

10. A non-transitory computer-readable storage medium storing a program that causes a computer to perform a data control method using a data control apparatus, the data control method comprising:
a first communication step of a first communication unit of the data control apparatus communicating with a first device placed on a predetermined surface of the data control apparatus;
a second communication step of a second communication unit of the data control apparatus communicating with a second device;
a detection step of a detection unit of the data control apparatus detecting a position of the first device placed on the predetermined surface of the data control apparatus; and
a communication control step of a communication control unit of the data control apparatus control the first communication unit and the second communication unit, based on the position of the first device detected by the detection unit, whether to cause data to be transmitted from the first device to the second device or to cause data to be transmitted from the second device to the first device.

11. A data control apparatus, comprising:
a first communication unit adapted to communicate with a first device placed on a predetermined surface of the data control apparatus;
a second communication unit adapted to communicate with a first device placed on another predetermined surface of the data control apparatus;
a third communication unit adapted to communicate with a second device;
a detection unit adapted to detect which of the first communication unit and the second communication unit communicates with the first device; and
a communication control unit adapted to control the first communication unit, the second communication unit and the third communication unit, based on a result of detection by the detection unit, whether to cause data to be transmitted from the first communication unit to the third communication unit or to cause data to be transmitted from the third communication unit to the second communication unit.

12. A data control apparatus, comprising:
a first communication unit adapted to communicate with a first device placed on a surface of the data control apparatus;
a second communication unit adapted to communicate with a second device;
a detection unit adapted to detect on which of a first region and a second region on the surface is placed the first device; and
a communication control unit adapted to control the first communication unit and the second communication unit, based on a result of detection by the detection unit, whether to cause data to be transmitted from the first device to the second device or to cause data to be transmitted from the second device to the first device.

13. A data control method using a data control apparatus, comprising:
a first communication step of a first communication unit of the data control apparatus communicating with a first device placed on a predetermined surface of the data control apparatus;
a second communication step of a second communication unit of the data control apparatus communicating with a first device placed on another predetermined surface of the data control apparatus;
a third communication step of a third communication unit of the data control apparatus communicating with a second device;
a detection step of a detection unit of the data control apparatus detecting which of the first communication unit and the second communication unit communicates with the first device; and
a communication control step of a communication control unit of the data control apparatus controlling the first communication unit and the second communication unit and the third communication unit, based on the result of detection in the detection step, whether to cause data to be transmitted from the first communication unit to the third communication unit or to cause data to be transmitted from the third communication unit to the second communication unit.

14. A data control method, comprising:
a first communication step of a first communication unit of the data control apparatus communicating with a first device placed on a surface of the data control apparatus;
a second communication step of a second communication unit of the data control apparatus communicating with a second device
a detection step of a detection unit of the data control apparatus detecting on which of a first region and a second region on the surface is placed the first device; and
a communication control step of a communication control unit of the data control apparatus controlling the first communication unit and the second communication unit, based on the result of detection by the detection unit, whether to cause data to be transmitted from the first device to the second device or to cause data to be transmitted from the second device to the first device.

15. A data control apparatus, comprising:
a communication unit adapted to communicate with an external device placed on a predetermined surface of the data control apparatus;
a detection unit adapted to detect a position of the external device placed on the predetermined surface of the data control apparatus; and a communication control unit adapted to control the communication unit, based on the position of the external device detected by the detection unit, whether to cause data to be transmitted from the external device to the second device or to cause data to be transmitted to the external device.

16. The data control apparatus according to claim 15, wherein the detection unit redetects the position of the external device placed on the predetermined surface of the data control apparatus, and the communication control unit redetermines, when the detection units detects change of the position of the external device as a result of the redetection thereof, whether to control to cause data to be transmitted from the external device or to control to cause data to be transmitted to the external device.

17. The data control apparatus according to claim 16, wherein the communication control unit redetermines, when the detection unit detects change of the position of the external device as a result of the redetection thereof while the data sending and receiving with the external device is performed, whether to control to cause data to be transmitted from the external device or to control to cause data to be transmitted to the external device, after the running data sending and receiving with the external device has been completed.

18. A data control method using a data control apparatus, comprising:

a communication step of a communication unit of the data control apparatus communicating with an external device placed on a predetermined surface of the data control apparatus;

a detection step of a detection unit of the data control apparatus detecting a position of the external device placed on the predetermined surface of the data control apparatus; and a communication control step of a communication control unit of the data control apparatus control the first communication unit, based on the position of the external device detected by the detection unit, whether to cause data to be transmitted from the external device or to cause data to be transmitted to the external device.

* * * * *